UNITED STATES PATENT OFFICE.

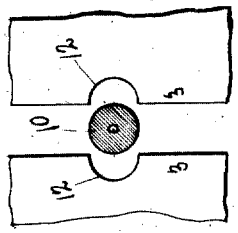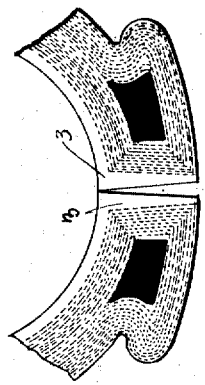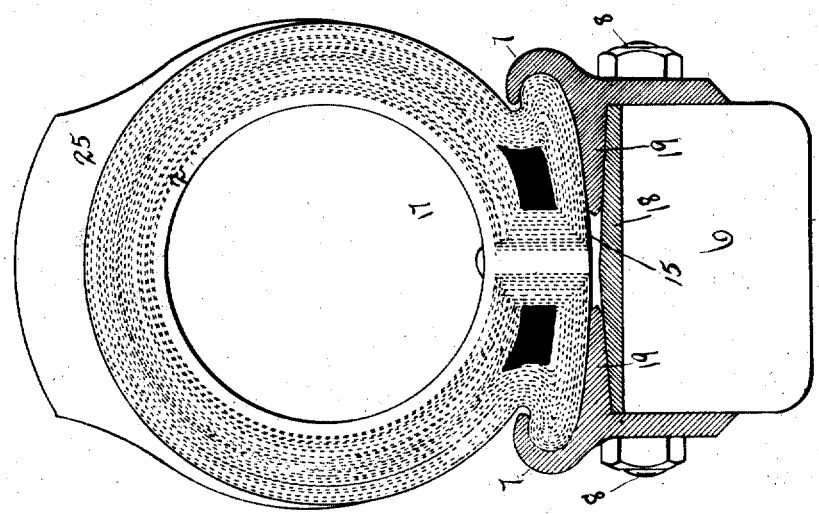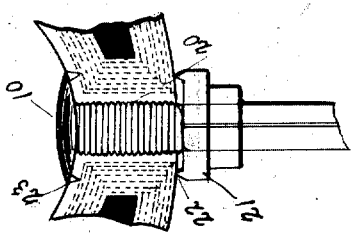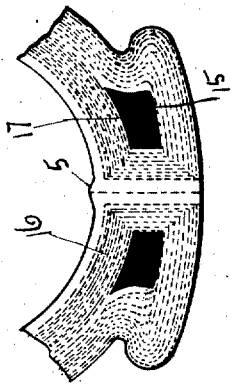

ISAAC S. McGIEHAN, OF MOUNT VERNON, NEW YORK.

PNEUMATIC TIRE FOR VEHICLES AND METHOD OF MAKING THE SAME.

1,225,344.  Specification of Letters Patent.  Patented May 8, 1917.

Application filed October 10, 1916. Serial No. 124,871.

*To all whom it may concern:*

Be it known that I, ISAAC S. McGIEHAN, a citizen of the United States, residing at Mount Vernon, in the county of Westchester and State of New York, have invented a new and useful Improvement in Pneumatic Tires for Vehicles and Methods of Making the Same, of which the following is a specification.

This invention relates to pneumatic tires for vehicles,—particularly that class of tires known as the single tube or hose pipe tire. It also relates to an improved method of making the tire, the method heretofore used having made the single tube tire for automobiles a failure.

It has for its object several distinct features:

First: To have the tire built over a solid cylindrical core, with its closing joint so arranged that the fabric in the tire cannot be ruptured, bent or distorted in any form, when the joint is closed.

Second: The closing joint of the tire being put together under great pressure so there can be no doubts as to securing a positive homogeneous and inseparable union between the parts.

Third: The molding and vulcanizing of the tire while it contains a very high internal air pressure, thus forcing the fabric and rubber outward against the mold and closing every infinitesimal pocket that may exist between the layers of fabric because of imperfect rolling, by an equal air pressure against the whole interior surface of the tire.

My invention is illustrated in the accompanying drawings which form a part of this specification and contain similar letters of reference to indicate the corresponding parts as follows:

Figure I represents a tire after it has been built up on a separable core number 1. The white portions 2 and 25 representing the clear rubber compound without fabric, and the dotted portion 33, representing the layers of fabric as they are laid up over the separable core 1.

Fig. II represents the tire after the separable core has been removed and the uniting edges 3 and 3 are brought together by the mold 4, showing that the pressure which unites the edges 3 and 3 is sufficient to force the surplus rubber to form a rim or bead 5 on the inside of the tire.

Fig. III illustrates the tire when finished after it is vulcanized and mounted on the felly 6 and clamped in place by the rims 7 and 7, held together with the desired amount of pressure by the bolt 8.

Fig. IV represents the uniting edges 3 and 3 showing the manner in which the upper points close first, in order that as the pressure is exerting on the beads as at 9 Fig. II, the air will be forced out at the bottom and the two contacting edges will be firmly and hermetically united.

Fig. V illustrates the same section after the uniting edges 3 and 3 have been compressed by the mold 4 as previously described.

Fig. VI illustrates the method of inserting the valve 10 before the uniting edges 3 and 3 are brought together.

Fig. VII illustrates the valve 10 in position after the joints have been united and vulcanized.

The only economic method employed heretofore in making the single tube or hose type tires, has been to build the tire up on a long straight mandrel after which the two ends are brought together and spliced (the same as the ordinary inner rubber tubes made to-day), then forcing it in a mold and inflating it to a limited extent, with gas or air. In doing this, the fabric is not only crimped and buckled, but the layers are separated and distorted to such an extent that the internal pressure while forcing the tire out against the mold, never re-unites the parts properly and that method finally had to be abandoned.

In my present invention as shown in Fig. I, all these difficulties have been overcome by building the tire on a proper metal core and rolling it down precisely the same as the ordinary shoe or casing of the present day is constructed, but leaving an opening through which the core may be removed.

The process being to put over the mandrel first, a layer of rubber as 2, which is approximately as thick as the ordinary single tube of the present day. This layer of rubber is rolled down on the core, so that its inner surface is absolutely smooth against the core, 1. On top of this layer of rubber, the fabric shown by the dotted lines 33, is rolled down in the same manner. Thus that portion of the fabric which forms the upper or tread side of the tire, is sufficiently longer than that portion which forms the lower or bead side of the tire, to provide a perfect structure without stretching or buckling the fabric in any direction, after the tire is formed.

The fabric employed is of course first spread or impregnated with rubber to fill the fabric and leave a coating of rubber on the outside sufficient to make it unite with the fabric, which is already rolled in place. On top of each layer of fabric beginning with the layer which covers the rubber 2, next to the core, is a thin film of rubber, and after this another layer of fabric,—so on alternatively, until the desired number of layers of fabric are applied to resist the internal pressure when the tire is inflated, each layer of course, having been rolled separately,—the number of layers being varied according to the thickness and tensile strain of the fabric,—also the size of the tire.

I may also add that in some cases the layers of this rubber between the layers of fabric may be omitted if the fabric carries sufficient coating of rubber to fill the fabric with the rubber when it begins to flow under the heat and pressure during the process of vulcanization.

After the desired thickness of fabric is built up the tread and side wall rubber 25, is stretched over that portion of the fabric heretofore described and as shown in Figs. I, II and III.

After this is accomplished the side molds 4, Fig. I, are applied and put under pressure sufficient to mold the tire into the form illustrated in Fig. I, leaving the space 11 between the uniting edges 3 and 3. When this has been accomplished and the tire thus formed, one of the side molds 34, is removed and the core 1, is taken out. The tire thus formed is lifted from the remaining side mold 34, and placed within one of the side molds 4 Fig. II. This having been done, (semi-depression 12 and 12 having been formed, while the tire was being pressed on core 1, as as in Fig. I), the valve 10 is laid within the semi-depression and the opposite mold 4 Fig. II is put in place and pressure applied to bring the joints of the molds 13 and 13 firmly together.

In this way the valve is embedded in the soft rubber dough in which the valve will adjust itself as the two edges are brought together. Thus when the pressure is applied to the molds 4 and 4, Fig. II, the valve will be in a fixed position as shown in Fig. VII and the two uniting edges 3 and 3 will have been perfectly joined as shown in Figs. II, III and V. Thus the internal or air chamber of the tire, is absolutely and hermetically sealed, with the air valve in place ready to inflate the tire.

After this point has been reached and the pressure is put on the side molds 4 and 4 Fig. II, to keep them firmly united, air pressure up to 100 or more pounds is pumped through the valve 10. The valve is then closed and the whole is put in the vulcanizer to cure.

In this way, as the air in the tire expands with the heat, the pressure will be increased and the layers of uniting fabric will be forced outward flat against the molds, or in that direction and should any portion of the fabric by means of imperfect weaving or rolling, fail to get the proper adherence to its neighbor, the pressure of air will cause the flowing rubber to fill the crevice or whatever space there may be and the result is an absolute inseparable union forming an integral cylindrical tube tire, sufficiently strong to carry an enormous internal pressure without bursting or leaking.

It must be understood that the lower or seating portion of the tire 15, which is built around the black core 16, Figs. 1, II, III, IV, V and VII, is made of a hard vulcanized rubber sufficiently hard to form a solid seating portion which can easily be retained in position by means of the clamping rim 7, without being compressed unduly or sufficient for the tire to become detached.

The hardness of the seat 15 and the black core 16, does not in any way tend to harden the rubber above the core 16, or that portion of rubber which encircles the valve,— the lower or seating portion 15 is practically as hard as gutta percha, while the inside portion 17, above the black core is very soft and yielding.

As illustrated in Fig. III, the metal rim 18, which surrounds the felly 6 of the wheel, is beveled outwardly in two directions, and the under portion of the lifting web 19 of the rim 7 is beveled to correspond. It will also be seen that the upper side of the lifting web 19 is tapered inwardly to correspond with the formation of the seat of the tire. Thus when the tire is being mounted it is supposed to fit closely on the center of the metal rim 18. The web 19 of the metal rims 7, is inserted between the metal rim 18 and the seat of the tire 15,—and as they are brought together by the bolt 8, the tire is stretched sufficient for the sides of the rim 7 to clamp the felly closely. In this way, the seat of the tire is so firmly held in position, that displacement is impossible.

Referring to the insertion of the valve 10, as illustrated in Fig. VII, the surface of the valve is provided with rings or circular grooves 20, into which the soft rubber flows when being vulcanized and forms a series of positive joints,—thus making it impossible for the valve to leak.

In addition to this, the valve is tightened with a nut 21, provided with a circular lip 22, corresponding with a circular lip 23, on the underside of the head of the valve. The nut 21, is screwed into place after the tire is vulcanized, which draws the circular lips 22 and 23, toward each other and into the vulcanized rubber, which forms an additional safeguard against the possibility of leakage.

Having thus described my invention, what I claim and desire to secure by Letters Patent, of the United States, is:

1. A single tube pneumatic tire formed of layers of fabric and rubber having uniting edges, a cylindrical strip of rubber between the edges of the fabric where the structure is integrally united, and a valve vulcanized within said strip of rubber.

2. A single tube pneumatic tire formed of layers of fabric and rubber constructed with circular uniting edges where the tire is joined together during the process of vulcanization, and a suitable valve for inflating the same, substantially as specified.

3. The herein described method of constructing a single tube pneumatic tire which consists of first forming the tire over a circular collapsible core leaving an opening from which the core may be removed,— then joining the said edges at the opening, and, by means of a suitably inserted valve, inflating the tire within a mold for vulcanizing as described.

4. The herein described method of constructing a single tube tire which consists of rolling the layers of rubber filled fabric on a collapsible metal core, leaving an opening at the bottom with bead formation on either side of the said opening,—removing the core from the opening on the lower side of the tire and placing the tire within a vulcanizing mold so formed as to close the said opening and cause the edges of the same to unite firmly, a suitable valve for inflating the tire within the mold and vulcanizing with internal pressure substantially as described.

In testimony that I claim the foregoing specification, I have hereunto set my hand this 9th day of October, nineteen hundred and sixteen.

ISAAC S. McGIEHAN.

Witnesses:
E. ADELMAN,
L. R. MERRITT.